(12) United States Patent
Courtright et al.

(10) Patent No.: US 6,430,655 B1
(45) Date of Patent: Aug. 6, 2002

(54) SCRATCHPAD RAM MEMORY ACCESSIBLE IN PARALLEL TO A PRIMARY CACHE

(75) Inventors: David A. Courtright, Los Gatos; Ryan C. Kinter, Mountain View, both of CA (US)

(73) Assignee: Mips Technologies, Inc., Mountain View, CA (US)

( * ) Notice: Subject to any disclaimer, the term of this patent is extended or adjusted under 35 U.S.C. 154(b) by 0 days.

(21) Appl. No.: 09/494,488

(22) Filed: Jan. 31, 2000

(51) Int. Cl.[7] .............................................. G06F 12/00
(52) U.S. Cl. ...................................................... 711/118
(58) Field of Search ................................. 711/133, 118

(56) References Cited

U.S. PATENT DOCUMENTS

| | | | | |
|---|---|---|---|---|
| 5,091,851 A | * | 2/1992 | Shelton et al. | ............... 711/128 |
| 5,325,511 A | * | 6/1994 | Collins et al. | ............... 711/128 |
| 5,493,667 A | * | 2/1996 | Huck et al. | ................. 711/125 |
| 5,764,999 A | * | 6/1998 | Wilcox et al. | ............... 710/261 |
| 6,044,478 A | * | 3/2000 | Green | ......................... 714/42 |

OTHER PUBLICATIONS

Analog Devices, ADSP–21535 Blackfin™ DSP, 2001.
R. Nass, "Latest DSPs Poised to Drive 3G Revolution," Portable Design, pp. 26–28, 32, 34, Sep. 2001.
Intel® StrongARM® SA–1100 Microprocessor Developers Manual, pp. i–xix; Chapters 1, 2, and 6, Aug. 1999. [Full copy of specification available at http://developer.intel.com/design/strong/manuals/278088.htm].
David Courtright, "Introducing: The MIPS32™ 4Kc™ and MIPS32™ 4Kp™ Processor Cores 'Jade'", Embedded Microprocessor Forum, May 5, 1999, pp. 1–25.

* cited by examiner

Primary Examiner—David L. Robertson
(74) Attorney, Agent, or Firm—Cooley Godward LLP

(57) ABSTRACT

A low-latency scratchpad RAM memory system is disclosed. The scratchpad RAM memory system can be accessed in parallel to a primary cache. Parallel access to the scratchpad RAM memory can be designed to be independent of a corresponding cache tag RAM, thereby enabling the scratchpad RAM memory to be sized to any specification, independent of the size of the primary cache data RAMs.

35 Claims, 6 Drawing Sheets

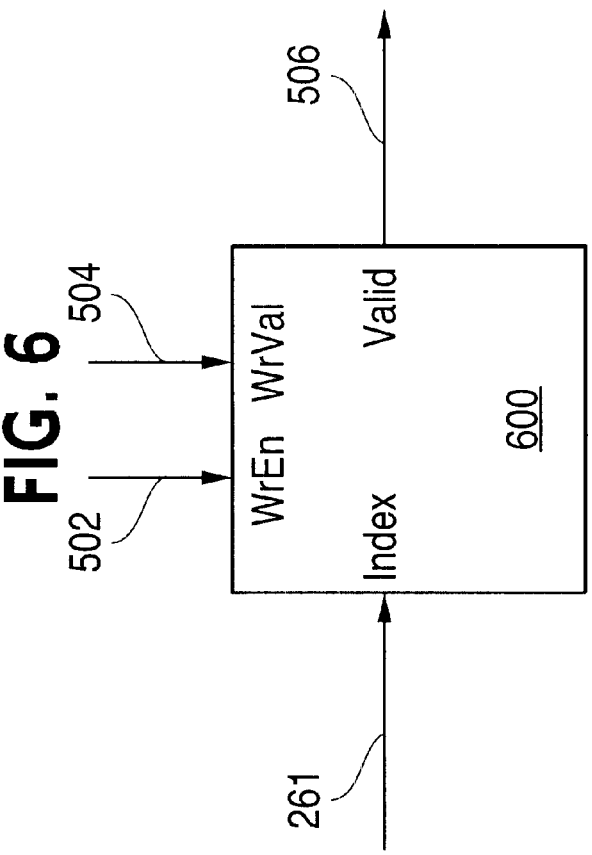
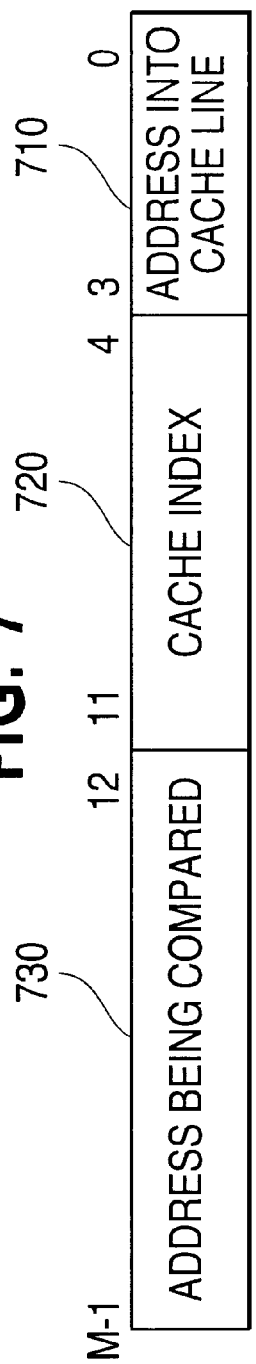

SCRATCHPAD RAM MEMORY ACCESSIBLE IN PARALLEL TO A PRIMARY CACHE

BACKGROUND

1. Field of the Invention

The present invention relates generally to internal memory systems, and more particularly, to a low-latency scratchpad RAM.

2. Discussion of the Related Art

Cache memory systems are well known and provide fast temporary data storage in a manner essentially transparent to the user. FIG. 1 illustrates a conventional memory architecture 100. Memory architecture includes microprocessor 110, which further includes cache controller 112 and primary cache 114. Primary cache 114 is an internal cache memory, typically with a size of 8 kilobytes–32 kilobytes. Primary cache 114 can be split into separate portions, one portion containing data (D-cache) and the other portion containing instructions (I-cache).

In a typical memory access, microprocessor 110, through on-chip cache controller 112, attempts to access the next instruction or data in primary cache 114. If the instruction or data is present in primary cache 114, a primary-cache hit occurs and microprocessor 110 retrieves the instruction or data from primary cache 114. If the instruction or data is not present in primary cache 114, a primary-cache miss occurs. Microprocessor 110 may then attempt to retrieve the instruction or data from an optional secondary cache 120. Secondary cache 120 is an external cache memory, typically with a size of 128 kilobytes to 4 Megabytes, that is accessed via bus interface unit (BIU) 116. If the instruction or data is not present in secondary cache 120 a secondary-cache miss occurs, at which time, microprocessor 110 would attempt to retrieve the instruction or data from further levels of cache or from main memory 130. As illustrated in FIG. 1, BIU 116 can also be configured to control the main memory bus interface.

In addition to the memory elements described above, it may also be desired to have a scratchpad RAM memory that can be reserved for direct and private usage by the microprocessor for tasks such as temporary storage or for communicating between processes. As the scratchpad RAM memory is a direct and private resource of the microprocessor, low latency in the access of the scratchpad RAM memory is desired.

SUMMARY OF THE INVENTION

The present invention addresses the aforementioned needs by providing a low-latency scratchpad RAM memory system that can be accessed in parallel to a primary cache. In accordance with the present invention, parallel access to the scratchpad RAM memory can be designed to be independent of a corresponding cache tag RAM. Accordingly, it is a feature of the present invention that the scratchpad RAM memory can be sized to any specification, independent of the size of the primary cache data RAMs.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 6 illustrates a programmable per line valid bit register.

FIG. 7 illustrates an example of an addressing scheme for a primary cache.

DETAILED DESCRIPTION OF THE PREFERRED EMBODIMENTS

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Cache memory systems are well known and provide fast temporary data storage. An important factor in determining the effectiveness of the cache relates to how the cache is mapped to system memory. There are three different ways that a cache can be mapped to system memory: direct mapping, fully associative mapping, and N-way set associative mapping.

In a direct mapped cache, the system memory is divided into portions based upon the number of cache lines in the cache. Each portion is associated with a single cache line. The single cache line is the sole location in the cache where data from the corresponding portion can be stored.

In a fully associative cache, there is no correspondence between locations in system memory and locations in the cache. Accordingly, any cache line can store the contents of any memory location.

Finally, in an N-way set associative cache (e.g., N=2, 3, 4, etc.), the cache is divided into sets where each set contains N cache lines. The system memory is then divided into portions based on the number of sets of cache lines in the cache. Each memory address is therefore assigned a set, and can be cached in any one of the N cache lines within that set. In other words, within each set, the cache is fully associative.

Conceptually, the direct mapped and fully associative caches are special cases of the N-way set associative cache. If N is set to one to make a one-way set associative cache, then there is only one cache line per set. This one-way set associative cache is the same as a direct mapped cache. On the other hand, if N is set to the number of lines in the cache, then only one set containing all the cache lines exists. Every memory location points to the one set, therefore representing a fully associative cache.

Direct mapped and set associative caches are more common in typical memory applications. Direct mapping is often used for secondary caches on the motherboard, while the higher-performance set associative cache is often used on the smaller primary caches contained within the microprocessor.

Figure 1:
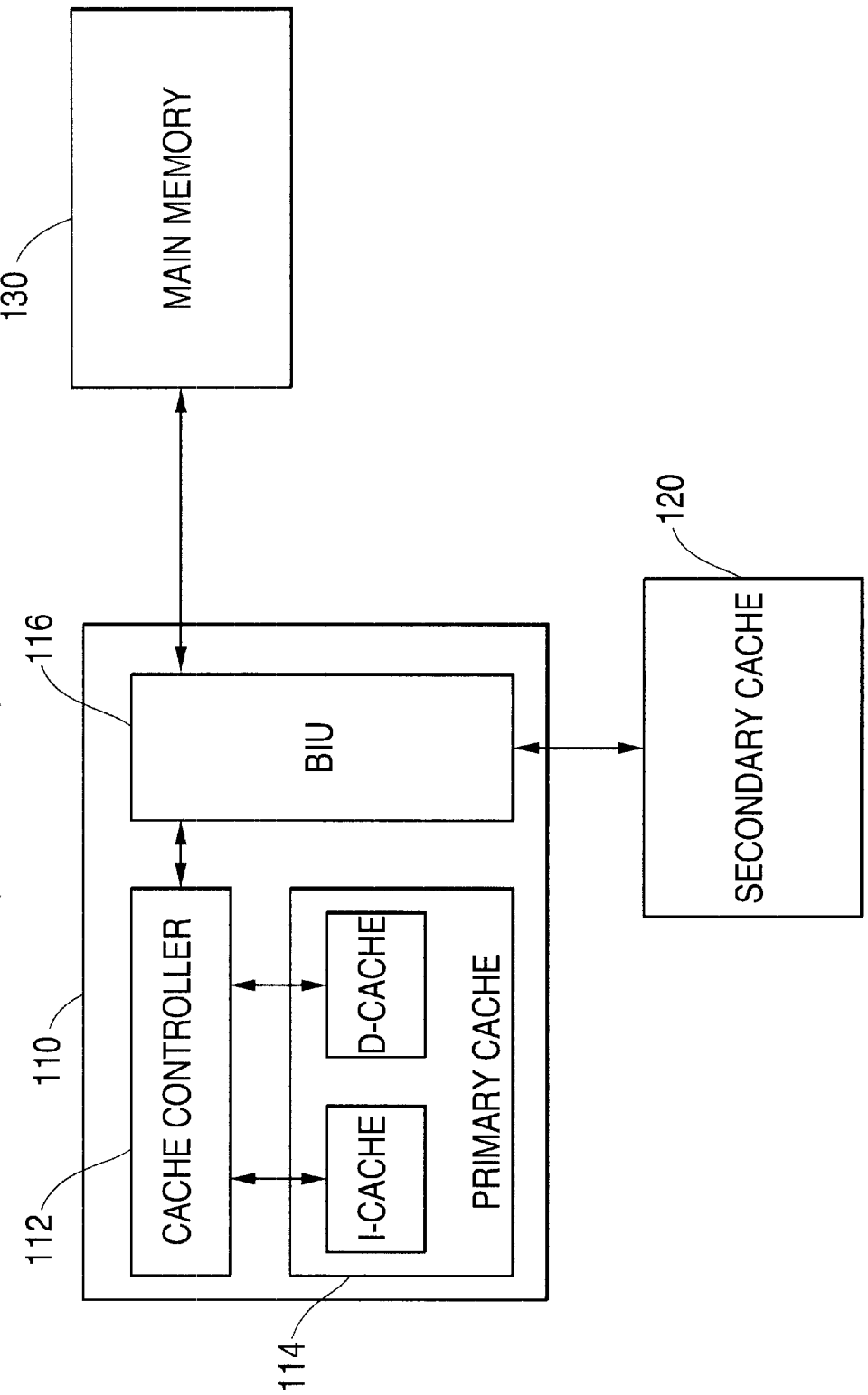
FIG. 1 illustrates a generic memory structure.
Figure 2:
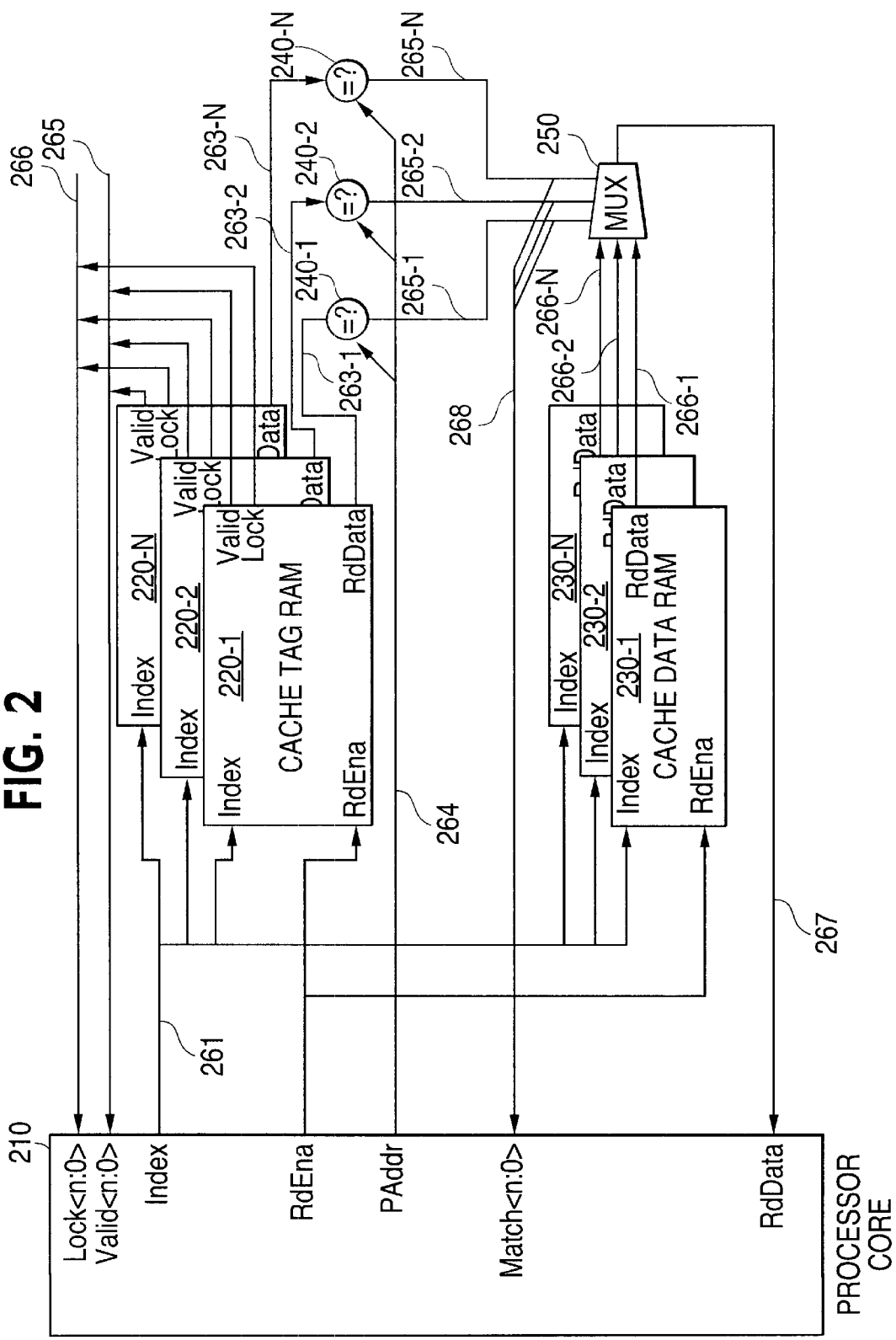
FIG. 2 illustrates an embodiment of a primary cache memory system.

FIG. 2 illustrates an embodiment of an N-way set associative primary cache. The N-way set associative primary cache includes cache tag RAMs 220-1, 220-2, 220-N and cache data RAMs 230-1, 230-2, 230-N. Cache data RAMs 230-1, 230-2, 230-N can be designed to store data or instructions. Cache tag RAMs 220-1, 220-2, 220-N are operative to keep track of where in cache data RAMs 230-1, 230-2, 230-N the data or instructions reside.

Each cache data RAM 230-1, 230-2, 230-N represents a "way"-sized section of memory within the microprocessor;

i.e., an entire "way" of the primary cache is configured in each data RAM. Each cache data RAM 230-1, 230-2, 230-N has a corresponding tag RAM 220-1, 220-2, 220-N that enables the microprocessor to determine what is stored in that "way."

When the microprocessor attempts to retrieve the instruction or data information from primary cache data RAMs 230-1, 230-2, 230-N, all of the N "ways" are searched. This search is initiated through the provision by processor core 210 of an index value on address line 261 to an input port on each of cache tag RAMs 220-1, 220-2, 220-N and each of cache data RAMs 230-1, 230-2, 230-N. The index value includes a set of bits that are sufficient to identify the total number of sets of cache lines in the primary cache. The index value can be based on a physical address or a virtual address. In a preferred embodiment, the cache arrays are virtually indexed, but the lower-based bits that are used are the same for both virtual and physical addresses.

Upon the receipt of the index value, tag RAMs 220-1, 220-2, 220-N each provide on an output port a tag value (i.e., a set of address bits) on data lines 263-1, 263-2, 263-N, respectively. As the artisan would appreciate, the particular number of address bits that are stored in the entries of tag RAMs 220-1, 220-2, 220-N is based upon the dimensions of the primary cache and the size of the system memory being mapped. The address bits output by a cache tag RAM 220-1, 220-2, 220-N identifies the contents of the cache line that is stored in the corresponding data RAM 230-1, 230-2, 230-N.

Consider, for example, cache tag RAM 220-1. Upon the receipt of the index value on an input port coupled to address line 261, cache tag RAM 220-1 provides on an output port coupled to data line 263-1 a set of address bits. This set of address bits identifies the contents of the cache line that is stored in cache data RAM 230-1 at the location identified by the index value. More particularly, the set of address bits identifies the contents of a particular "way" in the set identified by the index value. Collectively, the outputs of cache tag RAMs 220-1, 220-2, 220-N identify the contents of the N cache lines that make up the N "ways" of the set identified by the index value.

As further illustrated in FIG. 2, cache tag RAMs 220-1, 220-2, 220-N each also output a single valid bit and a single lock bit. The N valid bits output by tag RAMs 220-1, 220-2, 220-N are received by processor core 210 on data line 265, and the N lock bits output by tag RAMs 220-1, 220-2, 220-N are received by processor core 210 on data line 266. The N valid bits inform processor core 210 of the validity of the data stored in the N cache lines of the set identified by the index value. The N lock bits inform processor core 210 of whether one or more of the N cache lines of the set identified by the index value are reserved and cannot be overwritten. As will be described in greater detail below, the lock bit provides the general functionality of preventing the scratchpad data RAM from being selected for replacement. As would be readily apparent, any signal that informs processor core 210 of the existence of the scratchpad data RAM can also be used to implement the lock bit functionality.

The tag values output by tag RAMs 220-1, 220-2, 220-N are provided to circuits 240-1, 240-2, 240-N via data lines 263-1, 263-2, 263-N, respectively. Circuits 240-1, 240-2, 240-N are operative to compare a tag value with the address value being provided by processor core 210 on address line 264. This address value represents the memory location of the instruction or data that the microprocessor is requesting from the primary cache. The N comparison results generated by circuits 240-1, 240-2, 240-N are output on signal lines 265-1, 265-2, 265-N, respectively. The states of signal lines 265-1, 265-2, 265-N are returned to processor core 210 via data line 268 as a match signal. This match signal informs processor core 210 of whether a primary cache hit or primary cache miss occurred. If a primary cache miss occurred, then a secondary cache search would be initiated by the microprocessor.

If a primary cache hit occurred, then processor core 210 proceeds to retrieve the requested cache line data. The cache line data is made available to data line 267 based upon the control of multiplexer 250. Multiplexer 250 receives, on data lines 266-1, 266-2, 266-N, the N cache lines of data that are output by cache data RAMs 230-1, 230-2, 230-N, respectively. As noted, cache data RAMs 230-1, 230-2, 230-N are responsive to the index value provided to the input port coupled to address line 261. Based on the receipt of the index value, cache data RAMs 230-1, 230-2, 230-N provide on the output ports the data for the N "ways" in the set identified by the index value. Multiplexer 250 chooses which cache line data (or which "way") to forward to data line 267 based upon the match results that are received on status lines 265-1, 265-2, 265-N. All or part of the selected cache line is then returned to processor core 210 via data line 267.

As noted, the primary cache embodiment of FIG. 2 enables a microprocessor to reserve individual cache lines of the primary cache by setting the lock bit in the cache line's corresponding entry in one of cache tag RAMs 220-1, 220-2, 220-N. The reserved cache lines can then be used directly by the processor as scratchpad RAM memory. This per cache line reservation, however, comes at the expense of the overhead of cache tag RAMs 220-1, 220-2, 220-N. Alternatively, a scratchpad RAM can be implemented on the outside of-the bus interface unit. This implementation, however, subjects the scratchpad RAM memory to the long latency characteristics of main memory.

In accordance with the present invention, a scratchpad RAM is implemented in internal memory and can be accessed in parallel with the primary cache RAM access. This parallel access is a low-latency access and is enabled without the expense of the overhead of an associated tag RAM.

Figure 3:
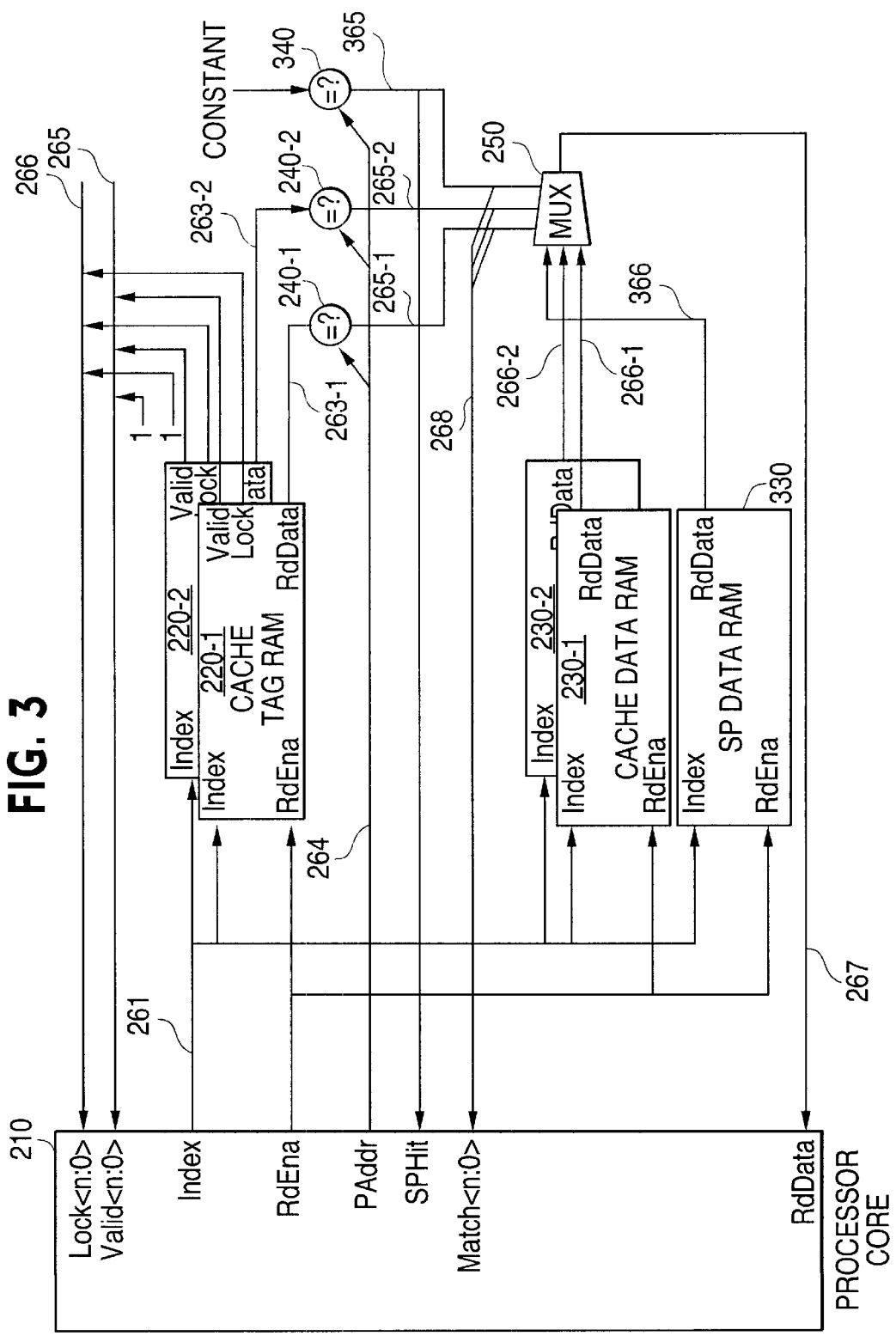
FIGS. 3–5 illustrate embodiments of a primary cache memory system having a scratchpad RAM memory.

A first embodiment of an implementation of a scratchpad RAM is illustrated in FIG. 3. In this embodiment, the scratchpad RAM is "way"-sized, i.e., an entire "way" of the primary cache has been configured as a scratchpad RAM memory. More specifically, as compared to the primary cache implementation of FIG. 2, data RAM 230-N has been configured as scratchpad data RAM 330.

As illustrated in FIG. 3, access to scratchpad data RAM 330 is in parallel to cache data RAMs 230-1, 230-2. Scratchpad data RAM 330 and cache data RAMs 230-1, 230-2 output stored data or instructions based upon the receipt of an index value on address line 261. The outputs of scratchpad data RAM 330 and cache data RAMs 230-1, 230-2 are provided to multiplexer 250 via data lines 366, 266-1, and 266-2, respectively.

Multiplexer 250 forwards data to data line 267 based upon control signals generated by circuits 240-1, 240-2, and 340. As described in the context of FIG. 2, circuits 240-1 and 240-2 compare the outputs of cache tag RAMs 220-1 and 220-2, respectively, with the address provided on address line 264. These comparisons control the access by processor core 210 to data stored in cache data RAMs 230-1, 230-2.

Access to scratchpad RAM 330, however, is not based upon the contents of a corresponding cache tag RAM. In other words, a cache tag RAM is not used to implement a per-cache-line reservation of a cache data RAM. Instead, access to scratchpad RAM 330 is based on a comparison by circuit 340 of the address provided on address line 264 with a constant value. This constant value is based on a set of address bits that uniquely identify an address range assigned to memory contained within scratchpad data RAM 330.

In operation, whenever processor core 210 desires to access scratchpad data RAM 330, circuit 340 determines whether the address value on address line 264 includes the set of address bits contained within the constant value. If circuit 340 identifies a match between the address value on address line 264 and the constant value, circuit 340 instructs multiplexer 250, via control line 365, to provide the data output by scratchpad data RAM 330 to processor core 210. The control value on control line 365 is also fed back to processor core 210 as a scratchpad hit signal.

The operation of circuit 340 in determining whether scratchpad data RAM 330 should be accessed is illustrated in the following example. Assume that a 16 kilobyte primary cache is four-way set associative with four-word (16-byte) cache lines. In this arrangement, each "way" of the primary cache would have 4 kilobytes/16 bytes=256 cache lines.

Each 4k "way" of memory can be addressed using 12 bits. These 12 address bits are illustrated in FIG. 7 in the context of an M-bit (e.g., 32 bit) address signal. The M-bit address signal includes sections 710, 720, and 730. Section 710 includes four address bits, designated as bit positions 3:0. This four-bit section is an address into the four-word (or 16 byte) cache lines.

Section 720 includes eight address bits, designated as bit positions 11:4. This eight-bit section is an index signal for the 256 sets of cache lines in the primary cache. As illustrated, the index signal is carried on address line 261 and provided to the cache tag RAMs, cache data RAMs, and scratchpad data RAM.

Section 730 includes the remainder of the M-bit address, designated as bit positions (M-1):12. Bit positions (M-1):12 uniquely identify a 4k (or 12-bit) address range. Bit positions (M-1):12 can therefore be used as the constant value that is input to circuit 340. If circuit 340 determines that bits (M-1):12 of the address appearing on address line 264 match the corresponding bits of the constant value, then an access into scratchpad data RAM 330 has been identified. After a match has been identified, circuit 340 instructs multiplexer 250 to forward the data output by scratchpad data RAM 330 to processor core 210.

As noted, scratchpad data RAM 330 does not rely on a corresponding tag RAM. More specifically, cache tag ram 220-N of FIG. 2 has been replaced by logic level "1" sources. These logic level "1" sources are provided to valid status line 265 and lock status line 266. The provision of a logic level "1" onto valid status line 265 ensures that processor core 210 will recognize all contents of scratchpad data RAM 330 as being valid. The provision of a logic level "1" onto lock status line 266 ensures that processor core 210 will recognize that the entire "way" represented by scratchpad data RAM 330 is not available for caching instructions or data.

As described above, a single "way"-sized cache data RAM (i.e., cache data RAM 230-N) can be configured into a scratchpad data RAM 330. It should be noted that the size of a scratchpad data RAM is not limited to a single "way." In alternative embodiments, a plurality of "way"-sized cache data RAMs can be configured into scratchpad data RAMs. For example, in a four-way set associative primary cache, two "way"-sized cache data RAMs can be reconfigured as scratchpad data RAMs. As access to each of these ways can be controlled by a different constant value, each of these "ways" can be mapped to different address regions. In general, any number of "ways," including all "ways," can be configured as scratchpad data RAMs.

More generally, a scratchpad data RAM need not be configured in "way"-sized sections. A scratchpad data RAM can be sized to a desired dimension that may be larger or smaller than a "way." Consider first a scratchpad data RAM 330 that is smaller than a "way." This configuration would also be supported by the embodiment illustrated in FIG. 3.

Access to a variable-sized scratchpad data RAM would be controlled by circuit 340. Circuit 340 determines whether the address value on address line 264 includes the set of address bits contained within the constant value. This constant value is based on a set of address bits that uniquely identify the variable-sized address range assigned to memory contained within scratchpad data RAM 330.

Assume for example that a "way" is sized at 4k and that the variable-sized address range is specified as 2k. This 2k address range can be addressed using 11 bits (i.e., bits 10:0). Thus, address bits (M-1):11 uniquely identify the 2k address range and would represent the constant value. As illustrated in FIG. 7, bit position 11 is one of the cache index bits. Accordingly, circuit 340 would use an additional address bit in its comparison.

It should be noted that circuit 340 can also be configured to compare an address on address line 264 to multiple constant values. These multiple constant values can represent multiple distinct portions (and sizes) of memory to which sections of the scratchpad data RAM are being mapped. For example, assume 2k of the scratchpad data RAM is being mapped to two 1k sections of addressable memory. Each of these 1k sections of addressable memory would be uniquely identified by a constant value that includes address bits (M-1):10. As would be apparent to one of ordinary skill in the relevant art, the index mechanism into scratchpad data RAM 330 would ensure that the two 1k sections of addressable memory would not overlap. In determining whether scratchpad data RAM 330 is being accessed, circuit 340 would determine whether the address on address line 264 matched one of the two constant values. If the address matched either constant value, then a scratchpad hit signal would result.

Figure 4:
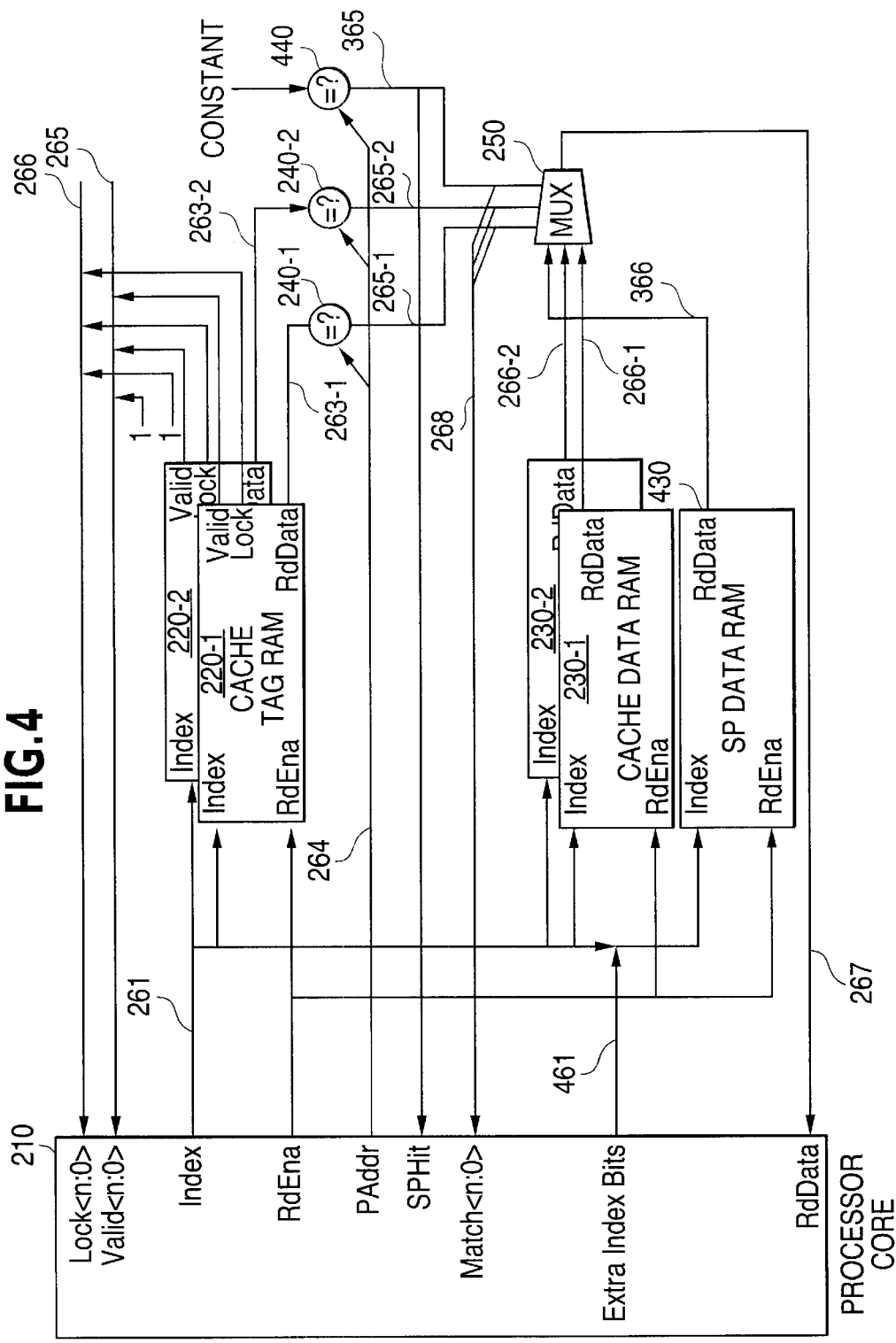

Scratchpad data RAMs can also be larger in size than a "way." An embodiment that supports this configuration is illustrated in the embodiment of FIG. 4. As described above, the index signal that is provided on address line 261 includes a number of bits that is sufficient to index the total number of cache lines in a particular "way." This index signal is insufficient to properly index scratchpad data RAM 430, which is larger in size than a "way." Accordingly, one or more additional index bits are required. These additional index bits are provided by processor core 210 via address line 461. The additional index bits are combined with the original set of index bits carried on address line 261 to produce an enhanced set of index bits that enables processor core 210 to completely address the number of lines of memory within scratchpad data RAM 430.

For example, consider the above-described scenario where a 16k primary cache is fourway set associative with four-word cache lines. In this arrangement, each 4k "way" of memory can be addressed using 12 bits, wherein bit positions 11:4 represent the index signal. Assume further that scratchpad data RAM 430 is sized at 16k. This 16k section of memory is four times the size of each "way" and therefore requires two additional index bits. In this example, the two additional index bits are provided on address line 461 and combined with the eight other address bits that are provided on address line 261 to produce an enhanced 10-bit index signal that addresses the 1024lines of memory in scratchpad data RAM 430.

Again, it should be noted that the scratchpad data RAM can be mapped to multiple regions of memory. For example, a 10k scratchpad data RAM 430 can be mapped to one 8k region and one 2k region of addressable memory. Each of these regions would have an associated constant value that would enable circuit 440 to determine whether scratchpad data RAM 430 was being accessed.

As thus described, a scratchpad data RAM can be configured as part of internal memory and can be accessed in parallel to the primary cache RAM access. It is a feature of the present invention that the size of the scratchpad data RAM is not based upon the size of a "way" in the primary cache. The scratchpad data RAM can be larger, smaller, or equivalent in size to a "way." It is a further feature of the present invention that one or more regions of memory can be mapped by the scratchpad data RAM.

In accordance with another embodiment of the present invention, all or part of the scratchpad data RAM can be replaced with a plurality of input/output (I/O) registers. Access to the plurality of I/O registers would be based upon the same access techniques as that of the scratchpad data RAM. Accordingly, a selected address range can be mapped to the plurality of I/O registers, which thereby enables low-latency access to the I/O registers. This embodiment represents an alternative to a co-processor like port.

It should be noted that access to the scratchpad data RAM has been described above in association with the reading of data. As would be apparent, the parallel mechanism of searching the primary cache and scratchpad data RAM would similarly be used in association with the writing of data into the primary cache or scratchpad data RAM. In particular, the concepts of the present invention can be used in caches that implement either a write-back or write-through policy. When used in association with a write-through cache implementation, additional logic would be included to ensure that main memory would not be updated upon a write into the scratchpad data RAM.

Figure 5:
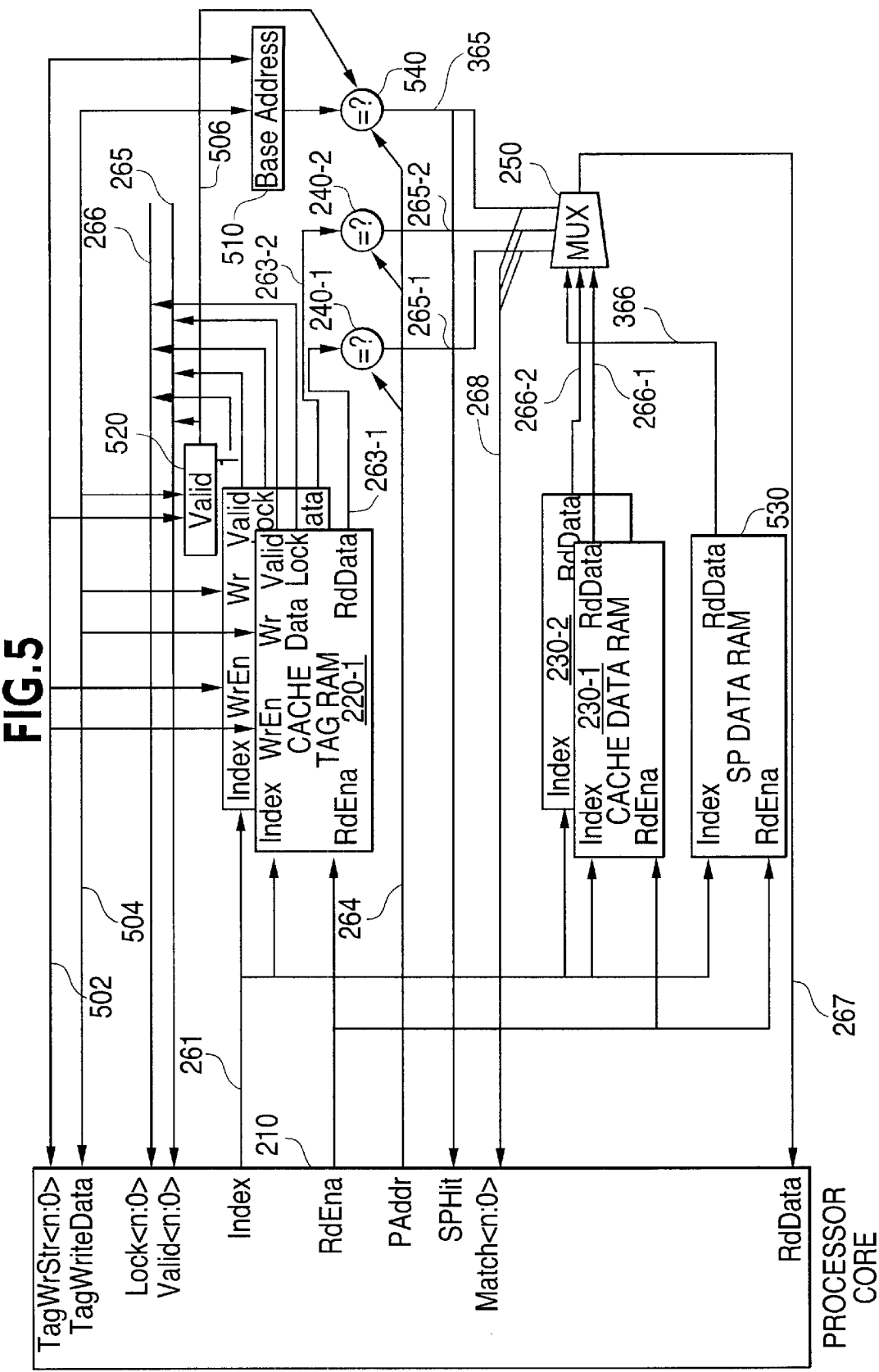

Further features of the present invention are now described with reference to the additional embodiment illustrated in FIG. 5. A first additional feature is a programmable base address. The programmable base address feature is enabled through the addition of base address register 510. Base address register 510 stores the base address of scratchpad data RAM 530. In other words, base address register 510 stores the constant value that is used by circuit 440 in determining whether the address on address line 264 matches an address mapped by scratchpad data RAM 530. Base address register 510 is programmable. The value to be stored in base address register 510 is provided by processor core 210 via data line 504. Through this programmable feature, software can dynamically change the physical address that scratchpad data RAM 530 is mapping.

A second additional feature is a programmable global valid bit. This programmable global valid bit feature is enabled through the addition of valid bit register 520. The valid bit in register 520 can also be set by software. The state of the valid bit is provided to circuit 440 via line 506. Until the valid bit is set, all references to scratchpad data RAM 530 would appear to be misses, thereby causing main memory access (e.g., refilling from slow flash RAM). This action results because circuit 440 would not generate a scratchpad hit signal. This feature allows scratchpad data RAM 530 to be filled via normal cache refill operations. Once scratchpad data RAM 530 is filled, software can write the valid bit and all future accesses will be handled by the scratchpad data RAM 530.

In an alternative embodiment, the valid bit is a programmable per line valid bit. Instead of a global programmable valid bit, an array of programmable valid bits is provided. This array of valid bits is stored in register 600, illustrated in FIG. 6. Once a given line in scratchpad data RAM 530 is written, its corresponding valid bit is set in register 600. All future accesses to that line will then be handled by scratchpad data RAM 530.

In addition to implementations of the invention using hardware, the invention can be embodied in a computer usable medium configured to store a computer readable program code. The program code causes the enablement of the functions or fabrication, or both, of the invention disclosed herein.

For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art.

The program code can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets.

It is understood that the functions accomplished by the invention as described above can be represented in a core which is embodied in programming code and transformed to hardware as part of the production of integrated circuits. Also, the invention may be embodied as a combination of hardware and software.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A random access memory system, comprising:
at least one cache data RAM having a first port by which an index signal can be received and a second port by which data stored at a location that is identified by the received index signal can be output;
at least one scratchpad data RAM having a first port by which the index signal can be received and a second port by which data stored at a location that is identified by the received index signal can be output;
at least one cache tag RAM having a first port by which the index signal can be received and a second port by which tag data stored at a location that is identified by the received index signal can be output, wherein each of said at least one cache tag RAM is associated with one of said at least one cache data RAM;

at least one first determining circuit that is coupled to said second port of a corresponding cache tag RAM and being operative to determine whether an identified address corresponds to an address output by said corresponding cache tag RAM; and at least one second determining circuit being operative to determine whether said identified address corresponds to a value that is produced independently of the index signal, wherein results from said at least one first determining circuit and said at least one second determining circuit are used to determine whether said at least one cache data RAM or said at least one scratchpad data RAM should be accessed.

2. The random access memory system of claim 1, further comprising a multiplexer that is coupled to said second port of each of said at least one cache data RAM and to said second port of each of said at least one scratchpad data RAM, said multiplexer being operative to receive a result signal from said at least one first determining circuit and said at least one second determining circuit.

3. The random access memory system of claim 1, comprising a plurality of cache data RAMs and a plurality of cache tag RAMs.

4. The random access memory system of claim 1, comprising a plurality of scratchpad data RAMs.

5. The random access memory system of claim 1, comprising one scratchpad data RAM.

6. The random access memory system of claim 1, further comprising a programmable per line valid bit register that is coupled to said second determining circuit.

7. The random access memory system of claim 1, wherein said second determining circuit compares said identified address to a value that does not change in accordance with the index signal.

8. The random access memory system of claim 7, further comprising a programmable address register that is coupled to said second determining circuit.

9. A random access memory system, comprising:

at least one cache data RAM having a first port by which an index signal can be received and a second port by which data stored at a location that is identified by the received index signal can be output;

at least one scratchpad data RAM having a first port by which the index signal can be received and a second port by which data stored at a location that is identified by the received index signal can be output;

at least one cache tag RAM having a first port by which the index signal can be received and a second port by which tag data stored at a location that is identified by the received index signal can be output, wherein each of said at least one cache tag RAM is associated with one of said at least one cache data RAM;

at least one first determining circuit that is coupled to said second port of a corresponding cache tag RAM and being operative to determine whether an identified address corresponds to an address output by said corresponding cache tag RAM;

at least one second determining circuit being operative to determine whether said identified address corresponds to a memory location mapped by said at least one scratchpad data RAM; and a programmable base address register that is coupled to said second determining circuit, wherein results from said at least one first determining circuit and said at least one second determining circuit are used to determine whether said at least one cache data RAM or said at least one scratchpad data RAM should be accessed.

10. A random access memory system, comprising:

at least one cache data RAM having a first port by which an index signal can be received and a second port by which data stored at a location that is identified by the received index signal can be output;

at least one scratchpad data RAM having a first port by which the index signal can be received and a second port by which data stored at a location that is identified by the received index signal can be output;

at least one cache tag RAM having a first port by which the index signal can be received and a second port by which tag data stored at a location that is identified by the received index signal can be output, wherein each of said at least one cache tag RAM. is associated with one of said at least one cache data RAM;

at least one first determining circuit that is coupled to said second port of a corresponding cache tag RAM and being operative to determine whether an identified address corresponds to an address output by said corresponding cache tag RAM;

at least one second determining circuit being operative to determine whether said identified address corresponds to a memory location mapped by said at least one scratchpad data RAM; and a programmable global valid bit register that is coupled to said second determining circuit, wherein results from said at least one first determining circuit and said at least one second determining circuit are used to determine whether said at least one cache data RAM or said at least one scratchpad data RAM should be accessed.

11. A random access memory system, comprising:

a primary cache that includes cache data RAM and corresponding cache tag RAM, wherein access to said cache data RAM is based on a determination of whether an identified address corresponds to at least part of a tag value, generated in response to an index signal, that is output by said corresponding cache tag RAM; and a scratchpad data RAM that can be accessed in parallel to said primary cache, wherein access to said scratchpad data RAM is based on a determination of whether an identified address corresponds to a value that is produced independently of said index signal.

12. The random access memory system of claim 11, wherein a size of said scratchpad data RAM corresponds to a size of a way of said primary cache.

13. The random access memory system of claim 11, wherein a size of said scratchpad data RAM does not correspond to a size of a way of said primary cache.

14. The random access memory system of claim 13, wherein said scratchpad data RAM is greater in size than a way of said primary cache.

15. The random access memory system of claim 13, wherein said scratchpad data RAM is smaller in size than a way of said primary cache.

16. The random access memory system of claim 11, wherein said scratchpad data RAM maps a single region of memory.

17. The random access memory system of claim 11, wherein said scratchpad data RAM maps a plurality of regions of memory.

18. The random access memory system of claim 11, wherein said value does not change in accordance with the index signal.

19. The random access memory system of claim 18, wherein said value is produced by a programmable address register.

20. A random access memory system, comprising:
a primary cache that includes cache data RAM and corresponding cache tag RAM, wherein access to said cache data RAM is based on a determination of whether an identified address corresponds to at least part of a tag value, generated in response to an index signal, that is output by said corresponding cache tag RAM; and
one or more input/output registers that can be accessed in parallel to said primary cache, wherein access to said one or more input/output registers is based on a determination of whether an identified address corresponds to a value that is produced independently of said index signal.

21. A computer program product comprising:
computer-readable program code for causing a computer to describe a primary cache, wherein said primary cache includes cache data RAM and corresponding cache tag RAM, and wherein access to said cache data RAM is based on a determination of whether an identified address corresponds to at least part of a tag value, generated in response to an index signal, that is output by said corresponding cache tag RAM;
computer-readable program code for causing a computer to describe a scratchpad data RAM, wherein said scratchpad data RAM can be accessed in parallel to said primary cache, and wherein access to said scratchpad data RAM is based on a determination of whether an identified address corresponds to a a value that is produced independently of said index signal; and
a computer-usable medium configured to store the computer-readable program codes.

22. A method for accessing a random access memory system, the method comprising the steps of:
(a) determining whether an identified address corresponds to an address, generated in response to an index signal, that is output by at least one cache tag RAM;
(b) determining whether said identified address corresponds to a value that is produced independently of said index signal; and
(c) selecting based upon results from steps (a) and (b) whether a cache data RAM or a scratchpad data RAM should be accessed.

23. The method of claim 22, wherein step (b) comprises the step of comparing said identified address to at least one value, said value being representative of an address region being mapped by a scratchpad data RAM.

24. The method of claim 23, wherein step (b) comprises the step of comparing said identified address to one value.

25. The method of claim 23, wherein step (b) comprises the step of comparing said identified address to multiple values.

26. The method of claim 23, wherein step (b) comprises the step of comparing said identified address to a value stored in a register.

27. The method of claim 23, wherein said address region is greater than a cache line of said cache data RAM.

28. The method of claim 22, wherein step (c) comprises the step of forwarding results from steps (a) and (b) to a multiplexer.

29. A method for accessing a random access memory system, comprising:
determining whether an identified address corresponds to an address, generated in response to an index signal, that is output by at least one cache tag RAM;
determining whether said identified address corresponds to a value that is produced independently of said index signal; and
selecting based upon said determinations whether a cache data RAM or a scratchpad data RAM should be accessed.

30. A method for enabling a computer to generate a random memory access system, comprising:
transmitting computer-readable program code to a computer, said computer-readable program code including:
computer-readable program code for causing a computer to describe a primary cache, wherein said primary cache includes cache data RAM and corresponding cache tag RAM, and wherein access to said cache data RAM is based on a determination of whether an identified address corresponds to at least part of a tag value, generated in response to an index signal, that is output by said corresponding cache tag RAM; and
computer-readable program code for causing a computer to describe a scratchpad data RAM, wherein said scratchpad data RAM can be accessed in parallel to said primary cache, and wherein access to said scratchpad data RAM is based on a determination of whether an identified address corresponds to a value that is produced independently of said index signal.

31. The method of claim 30, wherein computer-readable program code is transmitted to said computer over the Internet.

32. A computer data signal embodied in a transmission medium comprising:
computer-readable program code for causing a computer to describe a primary cache, wherein said primary cache includes cache data RAM and corresponding cache tag RAM, and wherein access to said cache data RAM is based on a determination of whether an identified address corresponds to at least part of a tag value, generated in response to an index signal, that is output by said corresponding cache tag RAM; and
computer-readable program code for causing a computer to describe a scratchpad data RAM, wherein said scratchpad data RAM can be accessed in parallel to said primary cache, and wherein access to said scratchpad data RAM is based on a determination of whether an identified address corresponds to a value that is produced independently of said index signal.

33. A memory system, comprising:
a primary cache that includes cache data RAM and corresponding cache tag RAM; and
a scratchpad data RAM that can be accessed in parallel to said primary cache, wherein access to said scratchpad data RAM is based on a determination circuit that operates independently of said cache data RAM.

34. A memory system, comprising:
a primary cache that includes cache data RAM and corresponding cache tag RAM; and
a scratchpad data RAM that can be accessed in parallel to said primary cache, wherein access to said scratchpad data RAM is based on a determination circuit that compares an identified address to a value representative of an address range, said address range being greater than a cache line of said primary cache.

35. A method for accessing a random access memory system, the method comprising: determining whether an identified address corresponds to an address output by a cache tag RAM;

determining whether said identified address corresponds to a memory location mapped by a scratchpad data RAM, said determining including comparing said identified address to a value that is representative of an address region greater than a cache line; and selecting based upon said determination whether said cache data RAM or said scratchpad data RAM should be accessed.

* * * * *